United States Patent
Sahu et al.

(10) Patent No.: US 12,320,465 B2
(45) Date of Patent: Jun. 3, 2025

(54) SYSTEM INCLUDING A THERMO-STRUCTURAL SPACER FOR AIR INLET AND COMPRESSOR INTERFACE

(71) Applicant: GM GLOBAL TECHNOLOGY OPERATIONS LLC, Detroit, MI (US)

(72) Inventors: Abhishek Kumar Sahu, Karnataka (IN); Saurabh Kumar Verma, Karnataka (IN); Ronald Miller, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 555 days.

(21) Appl. No.: 17/835,250

(22) Filed: Jun. 8, 2022

(65) Prior Publication Data

US 2023/0400141 A1    Dec. 14, 2023

(51) Int. Cl.
| | |
|---|---|
| *F16L 59/18* | (2006.01) |
| *F16L 23/036* | (2006.01) |
| *H01M 8/04082* | (2016.01) |
| *H01M 8/04111* | (2016.01) |

(52) U.S. Cl.
CPC .......... *F16L 59/184* (2013.01); *F16L 23/036* (2013.01); *H01M 8/04111* (2013.01); *H01M 8/04201* (2013.01)

(58) Field of Classification Search
CPC ....... F16L 23/02; F16L 23/036; F16L 59/184; F16L 41/086; F16B 43/00; F16B 5/0241
USPC .................................................. 411/531, 546
See application file for complete search history.

(56) References Cited

U.S. PATENT DOCUMENTS

| | | | |
|---|---|---|---|
| 6,585,468 B2 * | 7/2003 | Johnson ................ | F16B 41/002 411/533 |
| 2010/0055525 A1 * | 3/2010 | Uematsu ........... | H01M 8/04201 429/480 |
| 2019/0145416 A1 * | 5/2019 | Donato ............. | H01M 8/04111 415/100 |
| 2021/0071695 A1 * | 3/2021 | Figge .................... | F16B 5/0241 |

FOREIGN PATENT DOCUMENTS

| | | | | |
|---|---|---|---|---|
| CN | 102341613 A | * | 2/2012 | ............ F16B 5/0241 |
| EP | 2811176 A1 | * | 12/2014 | ............ F16B 5/0241 |

* cited by examiner

*Primary Examiner* — Zachary T Dragicevich
(74) *Attorney, Agent, or Firm* — Quinn IP Law

(57) ABSTRACT

A thermo-structural spacer is provided. The spacer includes a cylindrical center portion, a first flange connected to a first end of the cylindrical center portion, a second flange connected to a second end of the cylindrical center portion. The second end is distal from the first end. The spacer further includes an annular inner wall configured for providing a through hole extending through a longitudinal axis of the thermo-structural spacer. The cylindrical center portion is narrower than the first flange. The cylindrical center portion is narrower than the second flange. The thermo-structural spacer is configured for restricting heat transfer between the first flange and the second flange.

20 Claims, 4 Drawing Sheets

US 12,320,465 B2

SYSTEM INCLUDING A THERMO-STRUCTURAL SPACER FOR AIR INLET AND COMPRESSOR INTERFACE

INTRODUCTION

The disclosure generally relates to a system including a thermo-structural spacer for air inlet and compressor interface.

A fuel cell system may utilize a flow of hydrogen gas and a flow of air including oxygen to generate electrical energy. Hydrogen gas may be stored in a pressurized tank, and the hydrogen gas may be delivered at a first desired pressure which may be above atmospheric pressure. Air may be compressed by a compressor to provide a flow of air at a second desired pressure which may be above atmospheric pressure.

SUMMARY

A thermo-structural spacer is provided. The spacer includes a cylindrical center portion, a first flange connected to a first end of the cylindrical center portion, a second flange connected to a second end of the cylindrical center portion. The second end is distal from the first end. The spacer further includes an annular inner wall configured for providing a through hole extending through a longitudinal axis of the thermo-structural spacer. The cylindrical center portion is narrower than the first flange. The cylindrical center portion is narrower than the second flange. The thermo-structural spacer is configured for restricting heat transfer between the first flange and the second flange.

In some embodiments, the thermo-structural spacer is constructed with stainless steel.

In some embodiments, the thermo-structural spacer includes a longitudinal length of at least 10 millimeters.

In some embodiments, the thermo-structural spacer includes a longitudinal length of at least 18 millimeters.

In some embodiments, the thermo-structural spacer includes a ratio of a longitudinal length of the thermo-structural spacer to a width of the cylindrical center portion of at least 1.393 to one.

In some embodiments, the thermo-structural spacer includes a longitudinal length of at least 18 millimeters. The thermo-structural spacer includes a ratio of a longitudinal length of the thermo-structural spacer to a width of the cylindrical center portion of at least 1.393 to one.

According to one alternative embodiment, a system including a fuel cell device is provided. The system includes a compressor configured for providing pressurized air to the fuel cell device, an air inlet including a polymerized tube configured for providing a flow of air to the compressor, and a thermo-structural spacer disposed between the air inlet and the compressor. The thermo-structural spacer includes a cylindrical center portion, a first flange connected to a first end of the cylindrical center portion, and a second flange connected to a second end of the cylindrical center portion. The second end is distal from the first end. The spacer further includes an annular inner wall configured for providing a through hole extending through a longitudinal axis of the thermo-structural spacer. The system includes further a threaded fastener connecting the air inlet to the compressor. The thermo-structural spacer is disposed upon the threaded fastener and is configured for restricting heat transfer between the compressor and the air inlet. The compressor contacts the thermo-structural spacer at the first flange. The air inlet contacts the thermo-structural spacer at the second flange. The cylindrical center portion is narrower than the first flange. The cylindrical center portion is narrower than the second flange. The thermo-structural spacer is configured for restricting heat transfer between the first flange and the second flange.

In some embodiments, the compressor includes a compressor intake housing that is constructed with a metallic material.

In some embodiments, the thermo-structural spacer is constructed with stainless steel.

In some embodiments, the thermo-structural spacer includes a longitudinal length of at least 10 millimeters.

In some embodiments, the thermo-structural spacer includes a longitudinal length of at least 18 millimeters.

In some embodiments, the thermo-structural spacer includes a ratio of a longitudinal length of the thermo-structural spacer to a width of the cylindrical center portion of at least 1.393 to one.

In some embodiments, the thermo-structural spacer includes a longitudinal length of at least 18 millimeters. The thermo-structural spacer includes a ratio of a longitudinal length of the thermo-structural spacer to a width of the cylindrical center portion of at least 1.393 to one.

In some embodiments, the compressor is an internal part of a fuel cell system.

In some embodiments, the compressor is an external part of a fuel cell system.

According to one alternative embodiment, a method to connect an air inlet constructed with a polymer to a compressor is provided. The method includes fastening the air inlet configured for providing a flow of air to the compressor to the compressor with a plurality of threaded fasteners and disposing a plurality of thermo-structural spacers between the air inlet and the compressor, one of the plurality of thermo-structural spacers upon each of the plurality of threaded fasteners. Each of the thermo-structural spacers includes a cylindrical center portion, a first flange connected to a first end of the cylindrical center portion, and a second flange connected to a second end of the cylindrical center portion. The second end is distal from the first end. Each of the spacers further includes an annular inner wall configured for providing a through hole extending through a longitudinal axis of the thermo-structural spacer. The compressor contacts the thermo-structural spacer at the first flange. The air inlet contacts the thermo-structural spacer at the second flange. The cylindrical center portion is narrower than the first flange. The cylindrical center portion is narrower than the second flange. The thermo-structural spacer is configured for restricting heat transfer between the first flange and the second flange.

In some embodiments, each of the thermo-structural spacers is constructed with stainless steel.

In some embodiments, each of the thermo-structural spacers includes a longitudinal length of at least 10 millimeters.

In some embodiments, each of the thermo-structural spacers includes a longitudinal length of at least 18 millimeters.

The above features and advantages and other features and advantages of the present disclosure are readily apparent from the following detailed description of the best modes for carrying out the disclosure when taken in connection with the accompanying drawings.

DETAILED DESCRIPTION

Figure 1:
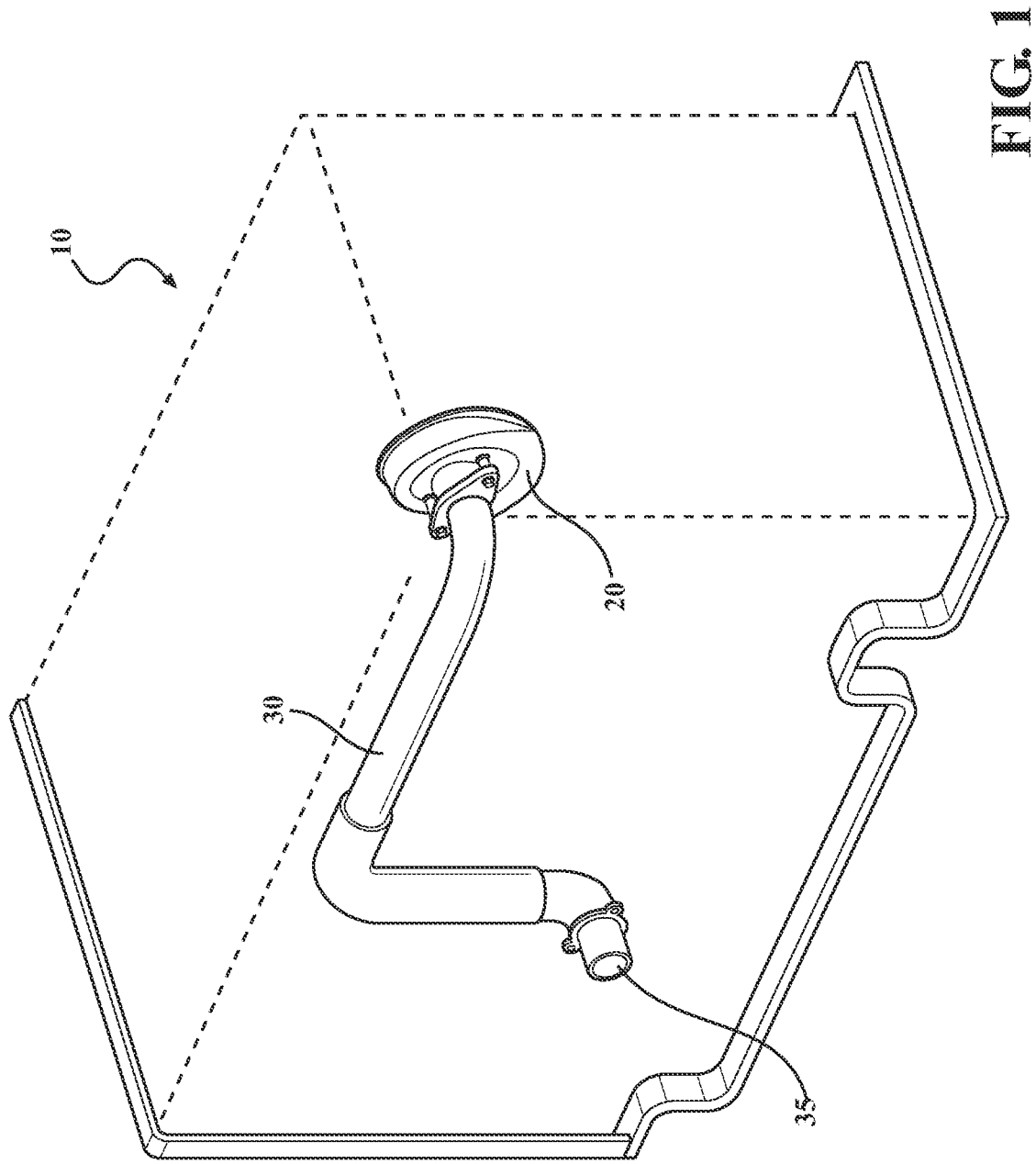
FIG. 1 schematically illustrates in perspective view an exemplary fuel cell system including a compressor and an air inlet connected to the compressor, in accordance with the present disclosure.

A fuel cell system (FCS) is an exemplary self-contained power plant, useful in a wide variety of applications. An FCS may be a feature available with common dimensions, weight, and other similar parameters. Similarly, the FCS may be optimized for size, weight, power output, etc., based upon anticipated applications in which it is to be used. In order to reduce weight, a portion of the components used within the FCS may be constructed of lightweight materials, such as polymers. In one exemplary embodiment, an air inlet or a tube configured to convey a flow of ambient air into the FCS for use by the fuel cell as a supply of oxygen gas may be constructed with a light weight, non-metallic material.

In order to deliver a flow of air to the fuel cell at a pressure higher than atmospheric air, an air compressor or pump may be utilized to pressurize the air. A compressor is an air compressor or pump that receives a flow of inlet air and provides a flow of pressurized output air. A compressor operates with power provided by a spinning input shaft. The input shaft powers compressor blades within the compressor. In one example, the input shaft of the compressor may receive power from an electrical motor. The spinning compressor blades within the compressor compress the inlet air. This process generates heat, which causes a temperature of the compressor's housings to rise. In light of the heat generated within the compressor, the housings of the compressor may be constructed with a metallic material that tolerates relatively higher temperatures. In one embodiment, the housings of the compressor may be constructed with aluminum alloy.

The air inlet, a light-weight tube constructed of a material such as a polymer, connects with and provides a flow of atmospheric air to an inlet of the compressor, which may be a round wall forming an orifice in the compressor. A temperature of the housing of the compressor may be relatively high during operation of the compressor and may be higher than a highest operating temperature of the material of the air inlet. A temperature of the housing of the compressor may not be constant across the housing. For example, at the round wall that receives the flow of air from the air inlet, the flow of air cools the housing in this area, such that the air inlet contacting this round wall may not exceed the highest operating temperature of the material of the air inlet. At a same time, a location on the housing of the compressor away from the round wall, for example, upon a scroll surface of the housing encasing the compressor blades of the compressor, may simultaneously be at a higher temperature, for example, at 175° C., in excess of the highest operating temperature of the material of the air inlet.

The air inlet may be fastened to the housing of the compressor to ensure that the air inlet is securely engaged to the round wall forming the inlet of the compressor. While the interface between the round wall and the air inlet may be at a relatively lower temperature, the features of the air inlet that are utilized to enable a threaded fastener to fasten the air inlet to the housing of the compressor may attach to the housing in a relatively higher temperature area. As a result, these features of the air inlet may be exposed to temperatures in excess of the highest operating temperature of the material of the air inlet.

A thermo-structural spacer is provided configured for being disposed between the air inlet and the housing of the compressor, such that a flow of heat from the housing to the air inlet is restricted. The thermo-structural has a dual role in the disclosed system. First, it imparts structural integrity and load transferability to the system as the air inlet is mounted on to the housing of the compressor. Second, a shape and material selection of the spacer enables the spacer to act as a thermal barrier, thereby preventing the material of the air inlet from reaching the relatively high temperature of the housing of the compressor. The disclosed thermo-structural spacer may be utilized within a FCS, another configuration of a fuel cell, or other configurations including attachment of a first part or device to a second part or device, where restriction of heat transfer between the first part and the second part is desirable.

Referring now to the drawings, wherein like reference numbers refer to like features throughout the several views, FIG. 1 schematically illustrates in perspective view an exemplary FCS 10 including a compressor 20 and an air inlet 30 connected to the compressor 20. The FCS 10 includes a fuel cell including an anode and a cathode and is configured for converting a flow of hydrogen gas and a flow of air into electrical energy. An outline of FCS 10 is provided with broken lines. The compressor 20 is configured to pressurize a flow of inlet air at atmospheric pressure for use by the fuel cell. An air inlet 30 is illustrated including an exemplary polymerized tube including an air inlet opening 35. The air inlet 30 is connected to the compressor 20. The illustrated compressor 20 may be mounted upon an external or internal portion of the FCS 10.

Figure 2:
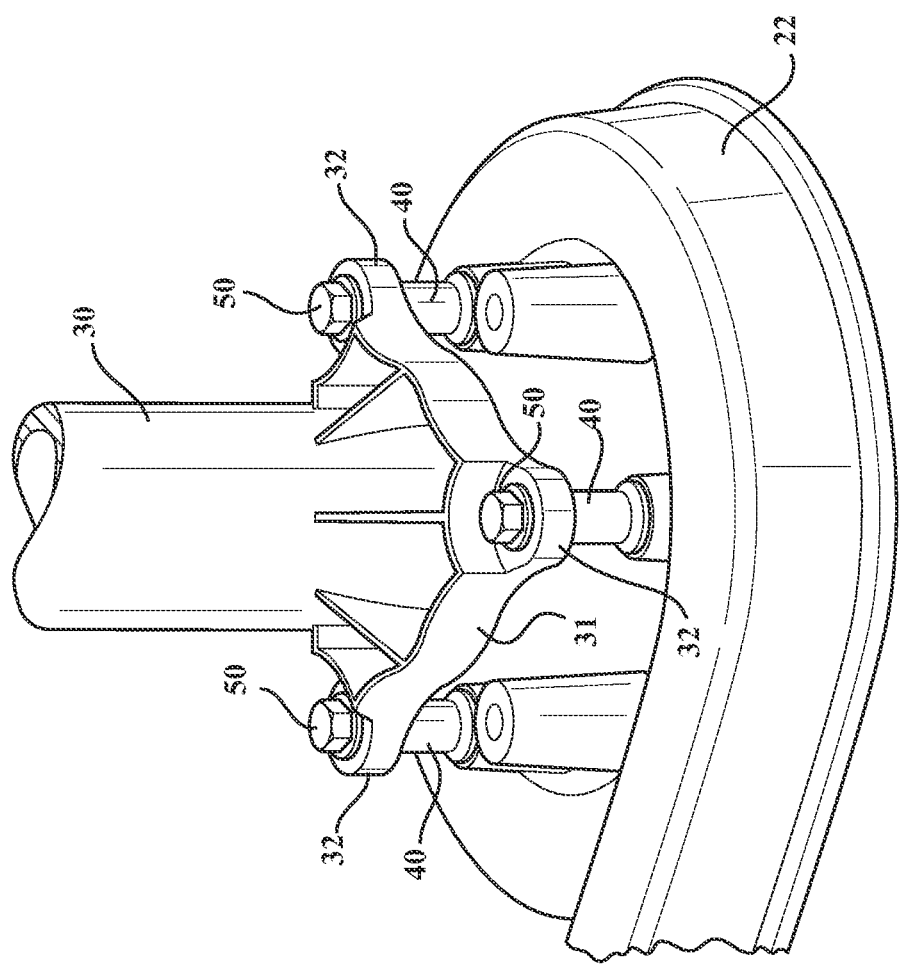
FIG. 2 schematically illustrates in a perspective view a compressor intake housing connected to the air inlet of FIG. 1, wherein a plurality of thermal insulating spacers are disposed between the compressor intake housing and the air inlet, in accordance with the present disclosure.

FIG. 2 illustrates in a perspective view a compressor intake housing 22 connected to the air inlet 30 of FIG. 1, wherein a plurality of thermo-structural spacers 40 are disposed between the compressor intake housing 22 and the air inlet 30. The air inlet 30 includes stiffening ribs 31 and connection features 32 including three reinforced fastener pads configured for receiving three threaded fasteners 50. The thermo-structural spacers 40 are illustrated each including a generally cylindrical shape and a hollow center configure to enable one of the threaded fasteners 50 to extend through the thermo-structural spacer 40 and into a respective fastener boss upon the compressor intake housing 22. In this way, the air inlet 30 may be connected to the compressor intake housing 22 without the material of the air inlet 30 coming into direct contact with the compressor intake housing 22.

A compressor 20 transforms an input torque or power provided through a spinning shaft into increased pressure of air or another gas drawn into the compressor 20. Compressing or pressurizing gas generates heat, and the compressor intake housing 22 may get substantially hotter or include a higher temperature than an ambient temperature. This high temperature of the compressor intake housing 22 may exceed a maximum temperature of the air inlet 30. The compressor intake housing 22 may include or may be constructed with a metallic material, which may be an excellent heat conductor or may be capable of transferring substantial heat from its high temperature surface to a neighboring part or device. By using the spacers 40 between the compressor intake housing 22 and the air inlet 30, the material of the air inlet 30 may be prevented from experiencing the high temperatures of the compressor intake housing 22. The compressor intake housing 22 and the mating features upon the air inlet 30 may take different forms. FIG. 1 illustrates two fasteners connecting the air inlet 30 to the compressor 20, while FIG. 2 illustrates three fasteners connecting the air inlet 30 to the compressor intake housing 22. These Figures illustrate alternative embodiments for attachment of the air inlet 30 to the compressor 20, and the disclosure is not intended to be limited to the examples provided herein.

Figure 3:
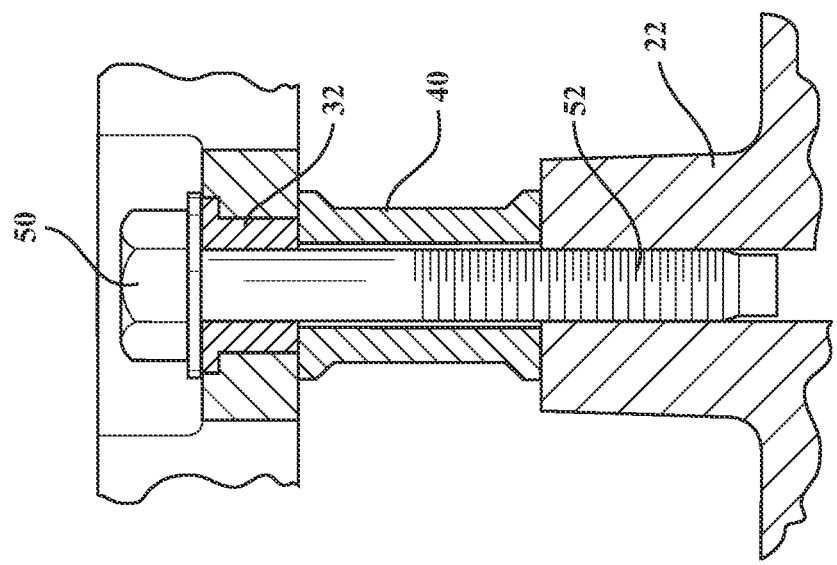
FIG. 3 schematically illustrates in cross-section a threaded fastener connecting the air inlet to the compressor, with a thermal insulating spacer being disposed upon the threaded fastener and being disposed between the air inlet and the compressor, in accordance with the present disclosure.

FIG. 3 illustrates in cross-section a threaded fastener 50 connecting the air inlet 30 of FIG. 2 to the compressor intake housing 22, with the thermo-structural spacer 40 being disposed upon the threaded fastener 50 and being disposed between the connection features 32 of the air inlet 30 and the compressor intake housing 22. The threaded fastener 50 is illustrated including fastener shaft 52.

Figure 4:
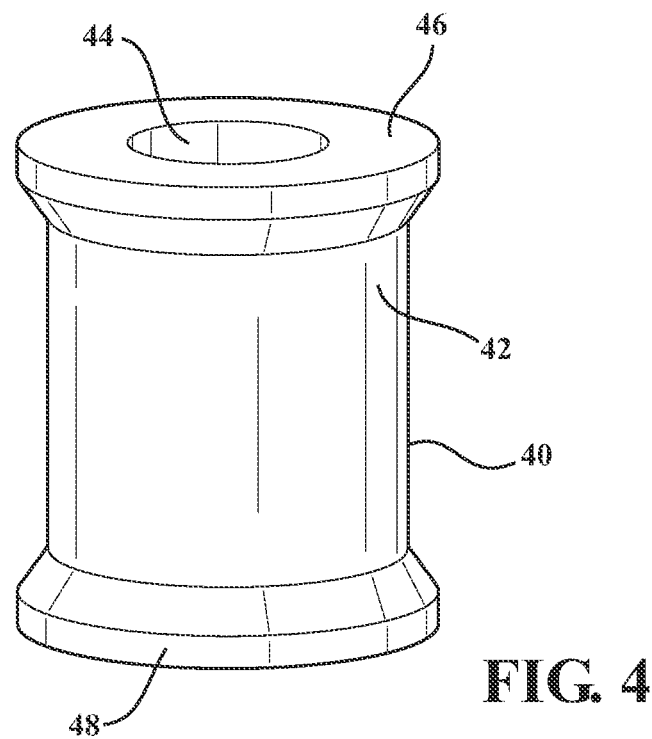
FIG. 4 schematically illustrates the spacer of FIG. 3 in perspective view, in accordance with the present disclosure.

FIG. 4 illustrates the spacer 40 of FIG. 3 in perspective view. The illustrated spacer 40 includes a relatively narrow cylindrical center portion 42, a first widened flange 46 on a top surface of the spacer 40, and a second widened flange 48 on a bottom surface of the spacer 40. The spacer 40 further includes a recess or an annular inner wall 44 configured for providing a through hole extending through a longitudinal axis of the spacer 40.

A shape of the spacer 40 is selected to resist a flow of heat through the spacer 40. The cylindrical center portion 42 is relatively narrow, creating a small cross-sectional area for heat to flow through. Additionally, the spacer includes a relatively length to width ratio, for example, including an 18.00 millimeters overall length and a 12.92 millimeters outer diameter of the cylindrical center portion 42. This high ratio enables heat to dissipate from the spacer 40 over the length of the spacer 40. Further, the spacer 40 may be constructed of a relatively strong material, such as stainless steel, to promote structural rigidity of the connection between the air inlet 30 and the compressor intake housing 22 of FIG. 2 and to provide additional thermal resistance in the material as compared to a similar spacer that may be constructed with an aluminum alloy or other steel alloy. Further, the flanges 46 and 48 provide additional surface area at the connection areas with the air inlet 30 and the compressor intake housing 22.

Figure 5:
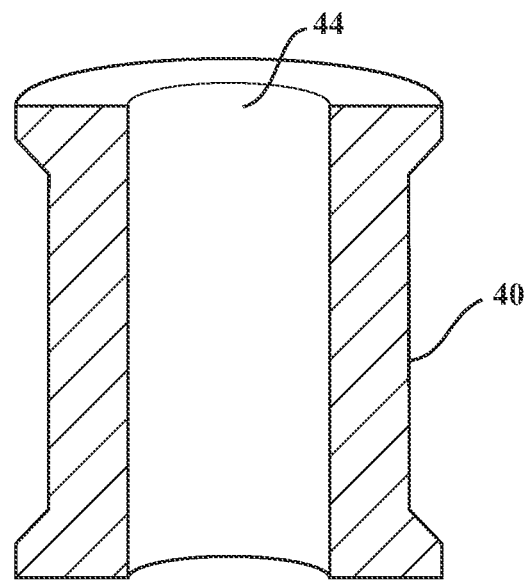
FIG. 5 schematically illustrates the spacer of FIG. 3 in cross-sectional view, in accordance with the present disclosure.

FIG. 5 illustrates the spacer 40 of FIG. 3 in cross-sectional view. The spacer 40 is illustrated including the annular inner wall 44 configured for providing a through hole. The shape of the spacer 40 is important to providing thermal insulation or resistance to heat flowing across the spacer 40. The widened flanges 46, 48 of FIG. 4 provide a substantial surface area on each distal end of the spacer 40, such that mechanical force or compression of the spacer 40 is applied over a matching substantial surface area on each of the connection features 32 and the compressor intake housing 22 of FIG. 3. Further, the cylindrical center portion 42 of FIG. 3, being more narrow than the flanges 46, 48 provides less cross-sectional area for heat to flow through the spacer 40 from the flange 48 to flange 46.

Additional length of the spacer 40 including additional length of the relatively narrow cylindrical center portion 42 provides additional thermal insulation or resistance to heat flowing through the spacer 40. In one embodiment, the spacer 40 is at least 10.00 millimeters long. One may define useful width or outer diameter of the spacer 40 to be between 12.00 millimeters to 14.00 millimeters. The dimensions are limited by buckling strength of the spacer. One may additionally or alternatively describe a ratio of longitudinal length of the spacer 40 versus an outer diameter of the spacer 40 in the cylindrical center portion 42. In the exemplary embodiment described in relation to FIG. 4, this ratio may be provided as 18.00 millimeters divided by 12.92 millimeters or 1.393 to one. One may define a spacer 40 with useful thermal insulating properties to include a length to width of the cylindrical center portion 42 ratio of between 1.2 to 1.4, upper limit is limited by buckling strength of spacer. A minimum ratio of the OD of the flanges to the OD of the center portion is governed by the dimension of connection features 32. In some embodiments, the ratio is limited to at least one.

Figure 6:
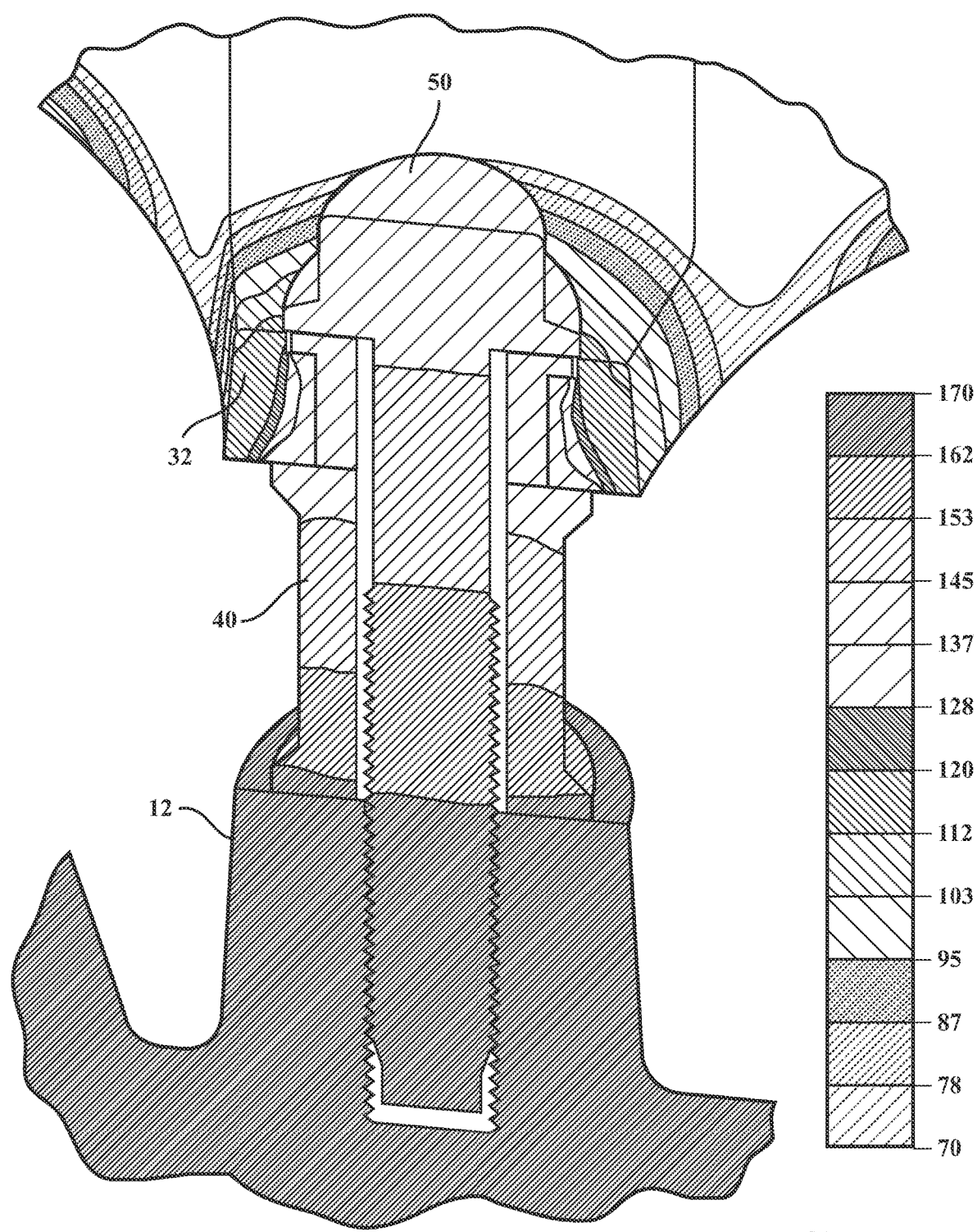
FIG. 6 schematically illustrates the threaded fastener, the air inlet, the compressor, and the thermal insulating spacer of FIG. 3, including temperature values across a cross-sectional view illustrating excellent thermal insulation of the thermal insulating spacer, in accordance with the present disclosure.

FIG. 6 schematically illustrates the threaded fastener 50, connection features 32 of the air inlet 30, the compressor intake housing fastener boss 12, and the thermal insulating spacer 40, including temperature values across a cross-sectional view illustrating excellent thermal insulation of the thermal insulating spacer 40. A temperature index is provided, correlating shading with temperature values in degrees Celsius. One may see that the thermal insulating spacer 40 provides excellent thermal insulation or resistance to heat flow, with approximately a 35 degree Celsius gradient across the thermal insulating spacer 40.

While the best modes for carrying out the disclosure have been described in detail, those familiar with the art to which this disclosure relates will recognize various alternative designs and embodiments for practicing the disclosure within the scope of the appended claims.

What is claimed is:

1. A system including a fuel cell device, comprising:
   a compressor configured for providing pressurized air to the fuel cell device;
   an air inlet including a polymerized tube configured for providing a flow of air to the compressor;
   a thermo-structural spacer disposed between the air inlet and the compressor, wherein the thermo-structural spacer includes:
   a cylindrical center portion;
   a first flange connected to a first end of the cylindrical center portion;
   a second flange connected to a second end of the cylindrical center portion, wherein the second end is distal from the first end; and
   an annular inner wall configured for providing a through hole extending through a longitudinal axis of the thermo-structural spacer; and
   a threaded fastener connecting the air inlet to the compressor, wherein the thermo-structural spacer is disposed upon the threaded fastener and is configured for restricting heat transfer between the compressor and the air inlet;
   wherein the compressor contacts the thermo-structural spacer at the first flange,
   wherein the air inlet contacts the thermo-structural spacer at the second flange;

wherein the compressor includes a compressor intake housing that is constructed with a metallic material;

wherein the cylindrical center portion is narrower than the first flange;

wherein the cylindrical center portion is narrower than the second flange; and wherein the thermo-structural spacer is configured for restricting heat transfer between the first flange and the second flange.

2. The system of claim 1, wherein the thermo-structural spacer is constructed with stainless steel.

3. The system of claim 1, wherein the thermo-structural spacer includes a longitudinal length of at least 10 millimeters.

4. The system of claim 1, wherein the thermo-structural spacer includes a longitudinal length of at least 18 millimeters.

5. The system of claim 1, wherein the thermo-structural spacer includes a ratio of a longitudinal length of the thermo-structural spacer to a width of the cylindrical center portion of at least 1.393 to one.

6. The system of claim 1, wherein the thermo-structural spacer includes a longitudinal length of at least 18 millimeters; and wherein the thermo-structural spacer includes a ratio of a longitudinal length of the thermo-structural spacer to a width of the cylindrical center portion of at least 1.393 to one.

7. A system including a fuel cell device, comprising:

a compressor configured for providing pressurized air to the fuel cell device;

an air inlet including a polymerized tube configured for providing a flow of air to the compressor;

a thermo-structural spacer disposed between the air inlet and the compressor, wherein the thermo-structural spacer includes:

a cylindrical center portion;

a first flange connected to a first end of the cylindrical center portion;

a second flange connected to a second end of the cylindrical center portion, wherein the second end is distal from the first end; and an annular inner wall configured for providing a through hole extending through a longitudinal axis of the thermo-structural spacer; and a threaded fastener connecting the air inlet to the compressor, wherein the thermo-structural spacer is disposed upon the threaded fastener and is configured for restricting heat transfer between the compressor and the air inlet;

wherein the compressor contacts the thermo-structural spacer at the first flange;

wherein the air inlet contacts the thermo-structural spacer at the second flange;

wherein the cylindrical center portion is narrower than the first flange;

wherein the cylindrical center portion is narrower than the second flange; and wherein the thermo-structural spacer is configured for restricting heat transfer between the first flange and the second flange.

8. The system of claim 7, wherein the compressor includes a compressor intake housing that is constructed with a metallic material.

9. The system of claim 7, wherein the thermo-structural spacer is constructed with stainless steel.

10. The system of claim 7, wherein the thermo-structural spacer includes a longitudinal length of at least 10 millimeters.

11. The system of claim 7, wherein the thermo-structural spacer includes a longitudinal length of at least 18 millimeters.

12. The system of claim 7, wherein the thermo-structural spacer includes a ratio of a longitudinal length of the thermo-structural spacer to a width of the cylindrical center portion of at least 1.393 to one.

13. The system of claim 7, wherein the thermo-structural spacer includes a longitudinal length of at least 18 millimeters; and wherein the thermo-structural spacer includes a ratio of a longitudinal length of the thermo-structural spacer to a width of the cylindrical center portion of at least 1.393 to one.

14. The system of claim 7, wherein the compressor is an internal part of a fuel cell system.

15. The system of claim 7, wherein the compressor is an external part of a fuel cell system.

16. A method to connect an air inlet constructed with a polymer to a compressor, comprising:

fastening the air inlet configured for providing a flow of air to the compressor with a plurality of threaded fasteners; and disposing a plurality of thermo-structural spacers between the air inlet and the compressor, one of the plurality of thermo-structural spacers upon each of the plurality of threaded fasteners, wherein each of the thermo-structural spacers includes:

a cylindrical center portion;

a first flange connected to a first end of the cylindrical center portion;

a second flange connected to a second end of the cylindrical center portion, wherein the second end is distal from the first end; and an annular inner wall configured for providing a through hole extending through a longitudinal axis of the thermo-structural spacer;

wherein the compressor contacts each of the thermo-structural spacers at the first flange;

wherein the air inlet contacts each of the thermo-structural spacers at the second flange;

wherein the cylindrical center portion is narrower than the first flange;

wherein the cylindrical center portion is narrower than the second flange; and wherein each of the thermo-structural spacers is configured for restricting heat transfer between the first flange and the second flange.

17. The method of claim 16, wherein each of the thermo-structural spacers is constructed with stainless steel.

18. The method of claim 16, wherein each of the thermo-structural spacers includes a longitudinal length of at least 10 millimeters.

19. The method of claim 16, wherein each of the thermo-structural spacers includes a longitudinal length of at least 18 millimeters.

20. The method of claim 16, wherein the thermo-structural spacer includes a ratio of a longitudinal length of the thermo-structural spacer to a width of the cylindrical center portion of at least 1.393 to one.

* * * * *